United States Patent [19]

Kelly, Jr. et al.

[11] Patent Number: 4,923,020
[45] Date of Patent: May 8, 1990

[54] ROCK BIT WITH RIGID FACE SEALS AND RECESSED ENERGIZERS

[75] Inventors: Joseph L. Kelly, Jr.; Michael F. Welsh, both of Houston, Tex.

[73] Assignee: Hughes Tool Company, Houston, Tex.

[21] Appl. No.: 210,681

[22] Filed: Jun. 23, 1988

[51] Int. Cl.⁵ ............................................. E21B 10/20
[52] U.S. Cl. .................................... 175/372; 277/83; 277/84
[58] Field of Search ...................... 175/228, 371, 372; 277/83, 84, 91, 92

[56] References Cited

U.S. PATENT DOCUMENTS

| | | | |
|---|---|---|---|
| 1,884,965 | 10/1932 | Baggett et al. | |
| 3,180,648 | 4/1965 | Kupfert | 277/92 |
| 3,656,764 | 4/1972 | Robinson | 175/371 X |
| 3,761,145 | 9/1973 | Schumacher | 308/8.2 |
| 4,516,640 | 5/1985 | Karlsson | 175/227 |
| 4,516,641 | 5/1985 | Burr | 175/228 |
| 4,548,280 | 10/1985 | Daley et al. | 175/40 |
| 4,577,705 | 3/1986 | Cross | 175/228 |
| 4,623,028 | 11/1986 | Murdoch et al. | 175/371 |
| 4,666,001 | 5/1987 | Burr | 175/371 |
| 4,688,647 | 8/1987 | Daley et al. | 175/40 |
| 4,753,303 | 6/1988 | Burr | 175/372 X |

*Primary Examiner*—William P. Neuder
*Attorney, Agent, or Firm*—Robert A. Felsman

[57] ABSTRACT

An improved mechanical face seal for rock bits using rigid rings and energizers placed in recesses or grooves in the cutter and bearing shaft. The minimum diameter of the shaft groove is substantially equal to the relaxed inside diameter of the shaft energizer and the maximum diameter of the cutter recess is substantially equal to the relaxed outside diameter of the cutter energizer. The radii at the inner end of the shaft groove and the outer end of the cone groove conform to the relaxed cross-section of their respective energizers. The mean diameter of the shaft energizer is substantially equal to the cone journal diameter and the product of the mean diameter and cross-sectional diameter is the same for both energizers.

12 Claims, 4 Drawing Sheets

ROCK BIT WITH RIGID FACE SEALS AND RECESSED ENERGIZERS

CROSS REFERENCE TO RELATED PATENTS

This application has disclosure in common with two copending applications, now U.S. Pat. No. 4,753,304, entitled "VOLUME AND PRESSURE BALANCED RIGID FACE SEAL FOR ROCK BITS", June 28, 1988 and U.S. Pat. No. 4,753,303, "EARTH BORING BIT WITH TWO PIECE BEARING AND RIGID FACE SEAL ASSEMBLY", June 28, 1988, each belonging to a common assignee.

BACKGROUND OF THE INVENTION

1. Field of the Invention

The field of this invention is earth boring bits—especially the seal and lubrication systems for rolling cutter rock bits.

2. Background Information

Recently, a meal face seal has been used successfully to seal lubricant within the rotatable cutter and around the cantilevered bearing shaft of a rock bit. U.S. Pat. No. 4,516,641, "Earth Boring Bit With Pressure Compensating Rigid Face Seal", May 14, 1985, includes background information leading to this important milestone in the continuing search for seal improvement. The seal disclosed in the '641 patent utilizes two rigid face seals which are urged against one another by a pair of O-ring type elastomeric seals confined in a seal groove between each cutter and its supporting bearing shaft. Since axial seal assembly movement is greater than axial cutter movement, seal and groove geometry is provided to permit unrestricted seal assembly movement. As a result, pressure pulses in the lubricant around the seal and lubricant losses are minimized. The seal assembly becomes a supplemental pressure compensator that assists the primary pressure compensator in each leg of the bit in maintaining a selected static, low pressure differential across the seal assembly.

An improvement to the structure disclosed in the '641 patent is disclosed in U.S. Pat. No. 4,666,001, "EARTH BORING BIT WITH IMPROVED RIGID FACE SEAL ASSEMBLY", May 19, 1987. Here, the positioning of the seal groove and seal assembly in relation to the journal bearing surface is such that rigid ring movement is decreased relative to axial cutter movement. In the preferred embodiment of the '001 patent the ratio of rigid ring movement to axial cutter movement is substantially one half to one. Hence, prolonged life of the seal assembly may be expected.

Each of the seal assemblies disclosed in the above patents uses two opposed rigid face rings and two resilient energizer rings in a groove configuration to achieve lubricant pressure equalization in the vicinity of the seal. In the related copending application which is now U.S. Pat. No. 4,753,303 is disclosed a seal assembly with fewer components in a reduced space. The volume and pressure of the lubricant adjacent the seal is essentially balanced. This also simplifies manufacture, forseeably reduces costs, and enables utilization to a wider variety of bit sizes and bit types.

SUMMARY OF THE INVENTION

It is the general object of the invention to provide a rock bit of the rotatable cutter type with an improved mechanical seal of the rigid face seal type to minimize pressure fluctuations in the lubricant in the vicinity of the seal, improve reliability and simplify assembly.

The above and additional objects of the invention are achieved with a pair of rigid rings and associated resilient energizers placed in the mouth of the cutter and at the base of a bearing shaft of the bit. At assembly, the energizers are squeezed between pairs of conical surfaces of selected dimensions and configurations. The minimum diameter of the shaft surface supporting the shaft energizers is substantially equal to the relaxed inside diameter of the shaft energizer, and the maximum diameter of the cutter surface supporting the cutter energizer is substantially equal to the relaxed outside diameter of the cutter energizer. Preferably, these supporting surfaces are in recesses with radii at the inner end of the shaft recess and the outer end of the cutter recess, each of which conforms to the relaxed cross-section of the associated energizer.

As a result of the above improvement, essentially all energizer squeeze contributes to face load, resulting in much greater useful deflection and thereby minimizing both face load and variations in face load due to cutter motion, energizer compression set and dimensional variations in the seal components and their mating shaft and cutter surfaces. Providing recesses to receive the relaxed energizers simplifies assembly and, in the case of the shaft energizer, reduces the magnitude of localized volume changes produced by axial cutter movement. Smaller volume changes allow the use of thinner energizers and smaller clearances to accommodate seal movement relative to the cutter in service. Greater useful deflection also tends to reduce energizer thickness.

Additional objects, features and advantages of the invention will become apparent in the following detailed description.

DESCRIPTION OF THE PREFERRED EMBODIMENT

Figure 1:
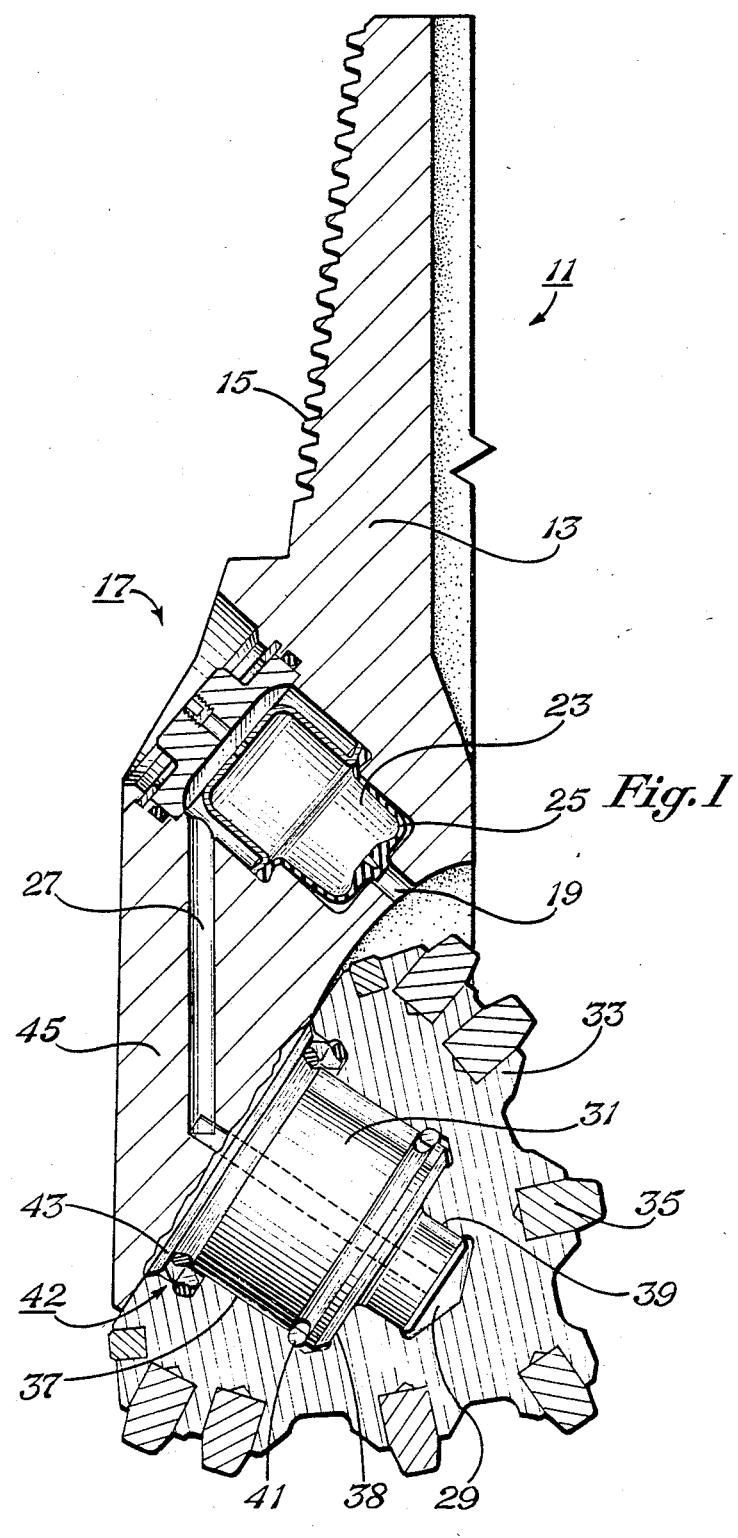
FIG. 1 is a longitudinal section of a rock bit of the rotatable cutter type which includes a pressure compensated lubrication system and a seal assembly that embodies the principles of the invention.

In FIG. 1, the numeral 11 designates a rock bit having a head section 13 that is usually one of three that forms a body which is threaded at 15 for connection to a drill string member (not shown). A lubricant pressure compensator system 17 is included in each section 13, being vented at 19 to the exterior of the bit and the ambient drilling mud in a bore hole (not shown). Lubricant fills a reservoir 23, which is separated from the drilling mud by a flexible diaphragm 25. The diaphragm 5 is part of a hydrostatic pressure compensator that tends to equalize the pressure of the lubricant with that of the drilling mud and maintains this pressure in the lubricant passage 27, as well as the space 29 and others between the bearing shaft 31 and the rotatable cutter 33. For additional information about the lubrication system see U.S. Pat. No. 4,055,225, "LUBRICANT PRESSURE COMPENSATOR FOR A ROCK BIT", Oct. 25, 1977. The bearing shaft 31 is cantilevered and extends inwardly and downwardly in supporting the cutter 33. Seal assembly 42 retains the lubricant within the bearing and prevents contamination by the drilling fluid and cuttings which normally surround the bit in service.

The cutter 33 has conventional teeth 35, here inserts of cemented tungsten carbide, and internal bearing surfaces that oppose those of the bearing shaft 31, including the journal bearing surface 37, thrust face 38 and pilot pin surface 39. The rotatable cutter 33 is secured to the bearing shaft 31 by a resilient snap ring 41. Additional information about the snap ring retainer system may be seen in U.S. Pat. No. 4,344,658 "CONE SNAP RING", Aug. 17, 1982. There are radial and axial clearances between the various components of the bearing and its retaining system, resulting in radial and axial play or movement of the cutter on the shaft during drilling. As a consequence, the cutter 33 acts as a pump as it moves on the bearing shaft 31 during drilling, creating volume changes accompanied by pressure pulses or fluctuations in the lubricant around the shaft.

Pressure pulses occur also in the seal area at the base 43 of the bearing shaft 31, where it joins the leg 45 of the head section 13. This invention reduces the amplitude of these pulses.

Figure 2:
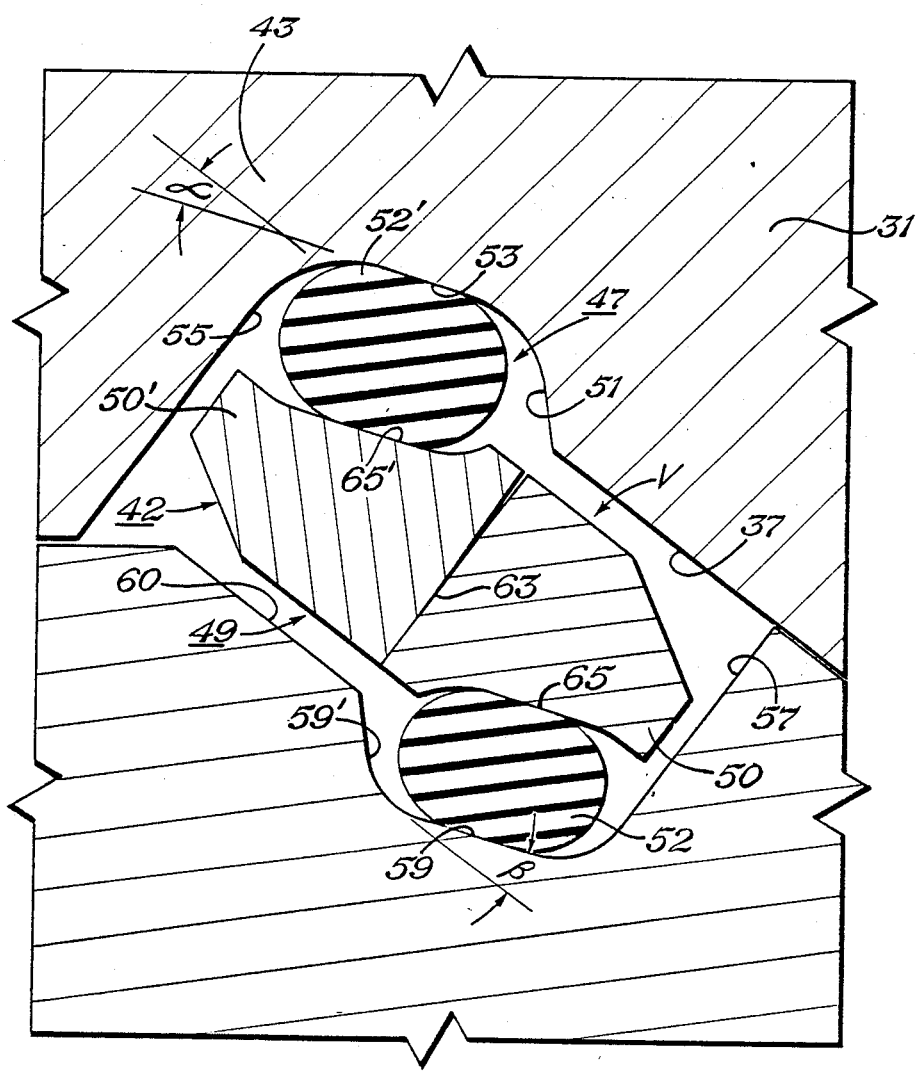
FIG. 2 is an enlarged and fragmentary longitudinal section which illustrates the seal assembly of FIG. 1 in greater detail.

As best seen in FIG. 2, the base 43 of the bearing shaft 31 contains an annular shaft seal groove 47 that opposes an annular cutter seal groove 49. Confined within these two grooves are a pair of rigid rings 50, 50' and a pair of resilient energizer rings 52, 52'.

The shaft seal groove 47 in the base 43 of the bearing shaft 31 is radially inward of the cylindrical journal bearing surface 37 toward the axis of rotation (not shown) of the cutter 33 and has an inner end wall 51, an outwardly facing and circumferential conical or beveled surface 53 at an angle alpha with the journal bearing surface 37, and an outer end wall 55. The opposed cutter seal groove 49 has an outwardly facing radial wall 57 and a beveled or conical circumferential surface 59, inclined at an angle beta and connected to a partial radial end wall 59' that intersects the cylindrical surface 60. The minimum diameter of the head groove recess 47 is approximately equal to the relaxed I.D. of the shaft energizer 52' and the maximum diameter of the cone groove or recess 49 is approximately equal to the relaxed O.D. of the cone energizer 52. Similarly, the journal bearing surface 37 intersects the mean diameter of the shaft energizer 52'. The energizers 52, 52' have differing thicknesses and shaft seal groove conical surface 53 and inner end wall 51 as well as cutter groove surface 59 and end wall 59' are bonded with radii that are substantially equal to one half the thickness of the associated energizer.

Rigid rings 50, 50' have opposing sealing faces 63 and circumferential conical or beveled regions 65, 65' opposed to the associated conical surfaces of the cutter or shaft seal groove.

Thus the shaft energizer ring 52' has its inner periphery inside the journal bearing surface 37 and is compressed between the conical surfaces 53, 65' of the shaft seal groove 47. Similarly, the cutter energizer 52 is compressed between the conical surfaces 65, 59 of the cutter seal groove 49 with its outer periphery at a greater diameter than cylindrical surface 60.

An improved mechanical face seal for rock bits is provided if constructed as illustrated in FIG. 2. The minimum diameter of the head groove recess 47 is approximately equal to the relaxed I.D. of the shaft energizer 52' and the maximum diameter of the cone groove or recess 49 is approximately equal to the relaxed O.D. of the cone energizer 52. The radii in head recess 47 and in the cone recess 49 conform to the relaxed cross-sections of their respective energizers. The mean diameter of the shaft energizer 52' is approximately equal to the journal diameter 37 and the product of the mean diameter and cross-section diameter is the same for both energizers 52, 52'.

This structure provides three advantages.

All energizer squeeze contributes to face load resulting in much greater useful deflection In U.S. Pat. No. 4,516,641, the O-ring energizers are squeezed radially at initial assembly. The compressive forces acting on the energizers are radial in direction and contribute nothing to face load. In this position the center of radius of the groove in the seal is approximately in the same radial plane as the center of radius of the groove in the head or cone and the energizer cross-sections are elliptic in shape. As the seals deflect the energizes are additionally squeezed across the bevels. The axial component of this compressive force produces face load. As the seals approach the surface at the base of the shaft or end of the cone or cutter groove or recess, the energizers are additionally squeezed across the fillets at the ends of the bevels. With this design, face load is very sensitive to deflection and variations in related energizer, shaft and cutter dimensions.

Figure 3:
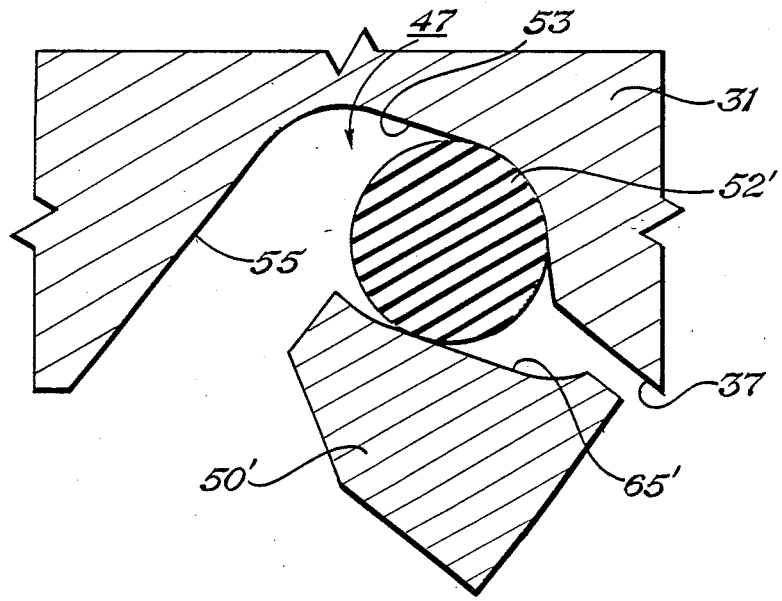
FIG. 3 is an enlarged, fragmentary longitudinal section of the shaft rigid ring and shaft energizer during one stage of assembly.
Figure 5:
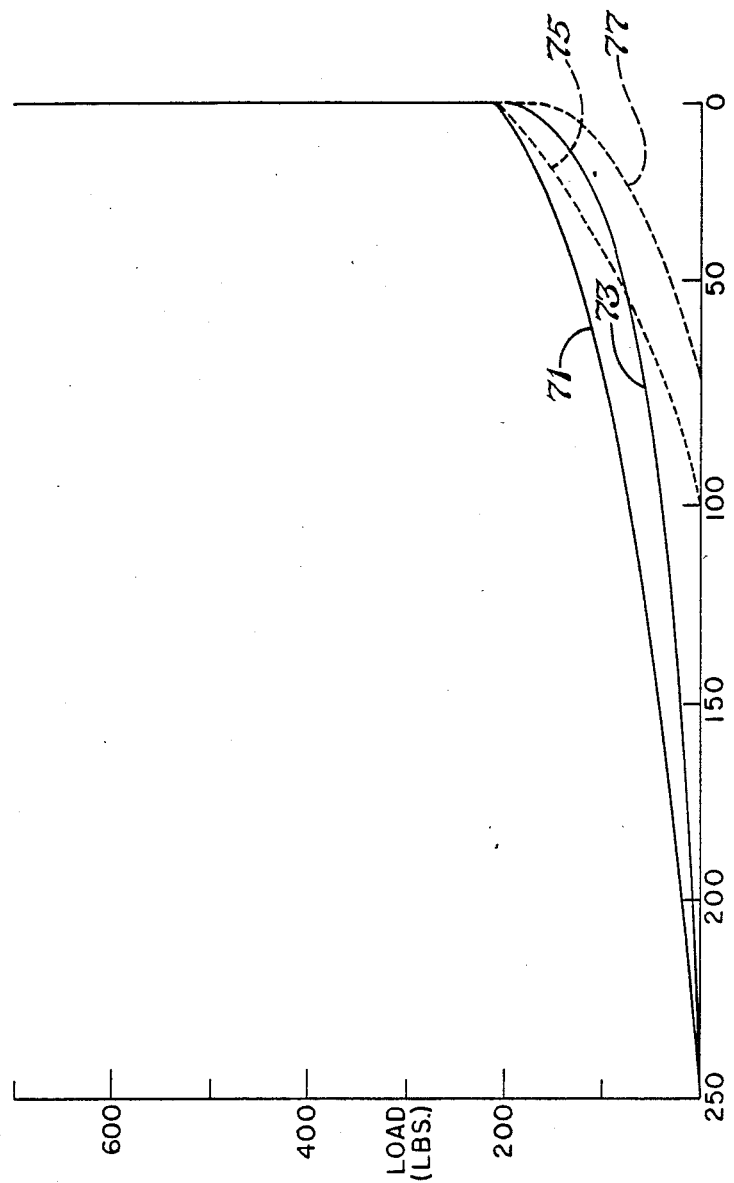
FIG. 5 is a graph showing face loads of metal face seals plotted against seal assembly deflection.

In the present invention as shown in FIG. 2, the energizers are squeezed across the bevels for the entire seal deflection range. At initial assembly, shown in FIG. 3, the energizer 52' is relaxed—it is not "stretched" and there is no radial squeeze. The same is true for the cutter groove energizer 52 (not shown in FIG. 3). As a result, to achieve the same squeeze across the bevels 53, 65' (resulting in approximately the same face load), the seals in this design must deflect further than the seals in the structure of U.S. Pat. No. 4,516,641. The difference in load/deflection of the two structures is shown in FIG. 5. As can be seen the deflection range for this invention shown by curves 71, 73 is greater and the slope is shallower than indicated by curves 75, 77 for the '641 structure. As a result, face load is less sensitive to cutter motion, compression set of the energizers and variation in related energizer and groove dimensions. This reduced sensitivity permits the use of lower seal face loads and smaller energizer thicknesses. Lower face loads increase seal life and smaller energizers reduce the space required by the seal.

Assembly is simplified and the risk of seal damage at assembly is minimized

Due to the radial squeezing of the energizers in '641, it is necessary to simultaneously install each energizer and its mating metal ring and, for the shaft energizer, this requires special tooling. This installation process can damage the energizers but it also forcibly retains the energizers between their mating parts so the damage cannot be seen. Furthermore, because the seal halves remain forcibly attached to the cutter and shaft, it is necessary to separate the precisely polished mating seal faces of the metal rings after the load deflection test, which is customarily made to check seal installation prior to final cutter installation. This separation of the seal faces exposes them to potential damage.

With the present invention, none of the above disadvantages exist. The shaft energizer is simply slipped over the shaft and into its mating recess. Similarly, the cutter energizer is placed in its mating recess. The rigid rings, held together with, for example, soluble tape, are then positioned against the shaft energizer; the cutter is slipped on to the shaft; the load deflection test is made; the cutter is removed allowing visual inspection of its energizer; and the rigid rings are moved sufficiently for visual inspection of the shaft energizer. If the load deflection test and energizer conditions are satisfactory, final assembly can then proceed. No special tooling is needed for seal installation; separation of the seal faces is not required; and the energizers are easily examined. It will be recognized that the energizer recesses are not essential to the assembly and inspection process, but they are helpful in keeping the energizers properly positioned.

The space occupied by the seal is reduced

The seal assemblies of the present invention, like those of '641 are self compensating. As the cone moves axially with respect to the head, the seals reposition themselves within the gland to maintain constant lubricant volume in the space V shown in FIG. 2, bounded by the seal, shaft and cutter. The seal/cone motion ratio of '641 is approximately 1.3 or 1.88 to one. By positioning the shaft energizer in a recess, this ratio is reduced and if the mean diameter of the shaft energizer is made equal to the journal diameter, the ratio becomes unity. The lower seal/cone ratio of the new design reduces the amount of end clearance required to assure that the seals do not bottom during normal cone motion.

A reduction in the seal/cone motion ratio also reduces the movement which the energizers must accommodate. This permits the use of smaller energizers and also reduces the space required by the seal.

A further reduction in seal space is achieved by making the cutter energizer smaller than the shaft energizer. This is permissible because the cutter energizer has a larger mean diameter; and therefore experiences less load per unit length. If angles alpha and beta are equal, the energizer thicknesses are balanced when their ratio is the same as the ratio of mean diameters; that is $D_s \times d_s = D_c \times d_c$ when D and d are used to denote mean diameter and thickness, respectively, and the subscripts s and c correspond to shaft and cutter respectively.

Another way to reduce the space required by the seal is to make angle beta larger than angle alpha.

Figure 4:
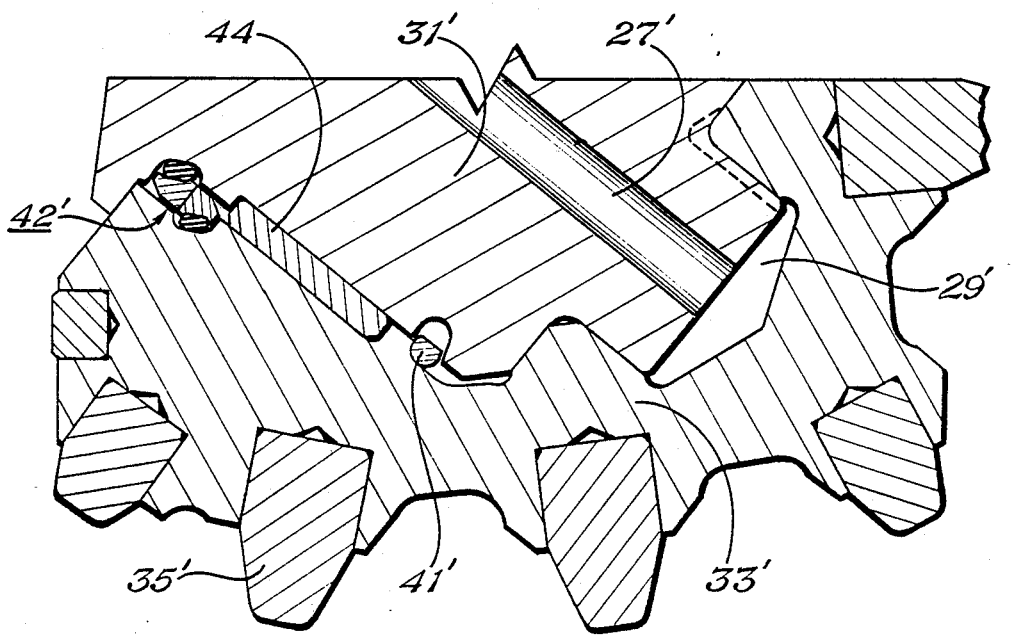
FIG. 4 is a fragmentary, longitudinal section of the lower portion of a rock bit which employs the invention with a journal bearing configuration differing from that of FIG. 2.

FIG. 4 illustrates an alternate embodiment rock bit which has, similar to FIG. 1, a bearing shaft 31' including a passage 27' and space 29'. The bearing shaft supports a cutter 33' and seal assembly 42', identical to that of FIGS. 1 and 2 and confines lubricant within the bearing area.

This bearing includes a free floating split insert or sleeve 44 to enhance bearing performance. The sleeve has a thickness of 0.188 inch and is made from 4137H AISI steel with a hardness of 34-36 Rockwell "C". The surfaces are plated with 0.001 inch tin over 0.002 inch silver. The cone and shaft journal bearing surfaces are manufactured from carburized steel.

The cutter 33' has conventional teeth 35' and is retained on the bearing shaft 31' by resilient snap ring 41', also similar to FIGS. 1 and 2.

While the invention has been shown in only two of its forms, it is not thus limited but is susceptible to various changes and modifications without departing from the spirit thereof.

We claim:

1. An earth boring bit with an improved pressure compensating face seal means, said bit comprising:
   a body;
   a cantilevered bearing shaft extending obliquely inwardly and downwardly from the body;
   a cutter secured for rotation about the bearing shaft, with axial and radial play due to clearances;
   a lubrication system in the body, including a hydrostatic pressure compensator;
   seal groove means including registering shaft and cutter seal grooves with a pair of oppositely facing radial end walls and a pair of oppositely facing circumferential, beveled walls, one located in the cutter and the other in the shaft, each of which intersects a respective radial end wall;
   a pair of rigid rings positioned in the seal groove means to have opposed and engaged sealing faces, each rigid ring having a bevel that is essentially parallel with and opposed to a selected essentially beveled wall in the groove means each of said bevel walls being free of a seal seat;
   a cutter and a shaft resilient energizer ring, each of which sealingly engages one of said beveled walls of a respective one of the rigid rings, and continuously engages one of the oppositely facing beveled walls of the seal groove means to be in contact exclusively with said beveled walls and define a seal assembly positioned between the end walls of the seal groove;
   the seal assembly being positioned intermediate the end walls of the groove means during assembly of the cutter on the bearing shaft and exposed to and moved axially by dynamic pressure differentials between the lubricant and the ambient drilling fluids;
   the axial width of the engaged rigid rings being less than the axial, minimum width of the seal groove when the cutter is thrust outwardly on the bearing shaft to define at least one axial clearance to permit unrestricted axial movement of the rigid rings beteen the end walls of the groove when the cutter moves relative to the bearing shaft.

2. The invention defined by claim 1, wherein the minimum diameter of the shaft groove is substantially equal to the relaxed inside diameter of the shaft energizer.

3. The invention defined by claim 2, wherein the maximum diameter of the cutter groove is substantially equal to the relaxed outside diameter of the cutter energizer.

4. The invention defined by claim 3, wherein a radius connects the beveled, circumferential wall and the radial end walls of each groove, the value of each radius being substantially equal to one half the thickness of the associated energizer.

5. The invention defined by claim 1, wherein the mean diameter of the shaft energizer is substantially equal to the cutter journal diameter.

6. The invention defined by claim 1, wherein the product of the mean diameter and cross sectional thickness of each energizer is substantially equal to that of the other energizer.

7. An earth boring bit with an improved seal means and pressure compensating system, said bit comprising:
   a body;
   a cantilevered bearing shaft extending obliquely inwardly and downwardly from the body;
   a cutter secured for rotation about the bearing shaft, with axial and radial play due to clearances;
   a lubrication system in the body, including a hydrostatic pressure compensator;
   seal groove means including a pair of substantially conical and oppositely facing radial end walls and a pair of oppositely facing circumferential walls, one located in the cutter and the other in the bearing shaft, each of which intersects a respective radial end wall;
   a pair of rigid rings positioned in the seal groove means and having opposed and engaged sealing faces and conical, circumferential walls, each of which is opposed, but spaced from an opposed conical and parallel wall in the groove means;
   a pair of O-ring type resilient energizer rings, each of which sealingly and continuously engages a respective one of the conical walls of the seal groove means and the opposed parallel conical wall of one of the rigid rings to define a seal assembly positioned between the end walls of the seal groove;
   the seal assembly being exposed to and biased axially by dynamic pressure differentials between the lubricant and the ambient drilling fluids;
   the axial width of the engaged rigid rings and seal assembly being less than the axial minimum width of the seal groove when the cutter is thrust outwardly on the bearing shaft to define at least one axial clearance to permit unrestricted axial movement of the rigid rings between the end walls of the groove when the cutter moves relative to the bearing shaft.

8. The invention defined by claim 7, wherein the minimum diameter of the shaft groove is substantially equal to the relaxed inside diameter of the shaft energizer.

9. The invention defined by claim 8, wherein the maximum diameter of the cutter groove is substantially equal to the relaxed outside diameter of the cutter energizer.

10. The invention defined by claim 9, wherein a radius connects the beveled, circumferential wall and the radial end wall of each groove, the value of each radius being substantially equal to one half the thickness of the associated energizer.

11. The invention defined by claim 7, wherein the mean diameter of the resilient energizer ring which engages the conical wall in the bearing shaft is substantially equal to the cutter journal diameter.

12. The invention defined by claim 7, wherein the product of the mean diameter and cross sectional thickness of each energizer is substantially equal to that of the other energizer.

* * * * *